Figure 1:
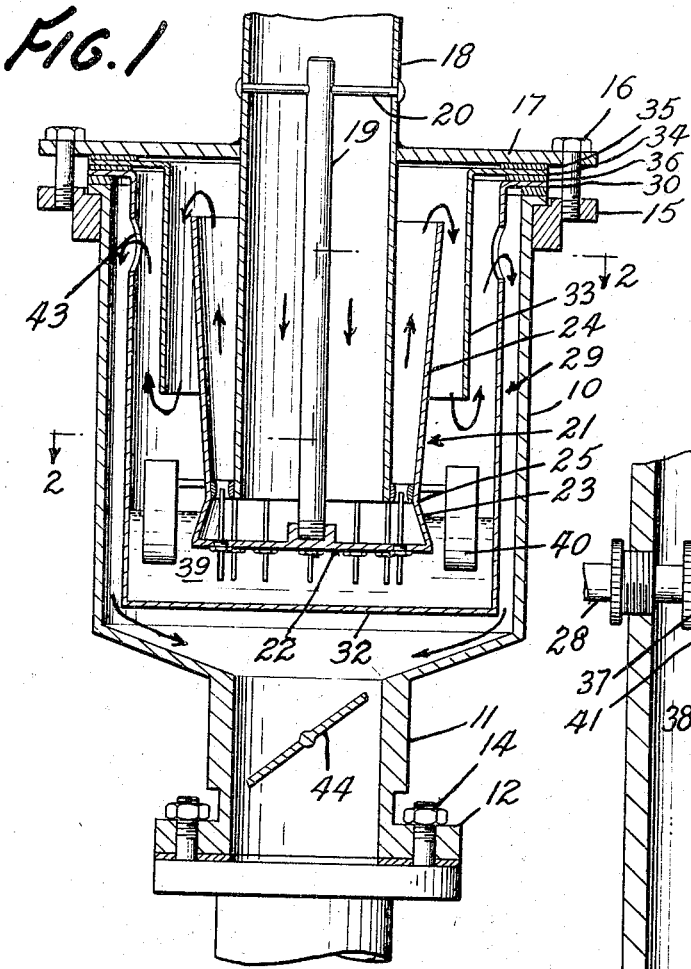

June 20, 1967  G. C. COVERSTON  3,325,975
CARBURETOR
Filed April 26, 1965  3 Sheets-Sheet 1

By Fisher, Christen Sabol & Caldwell
attys

June 20, 1967 G. C. COVERSTON 3,325,975
CARBURETOR
Filed April 26, 1965 3 Sheets-Sheet 2
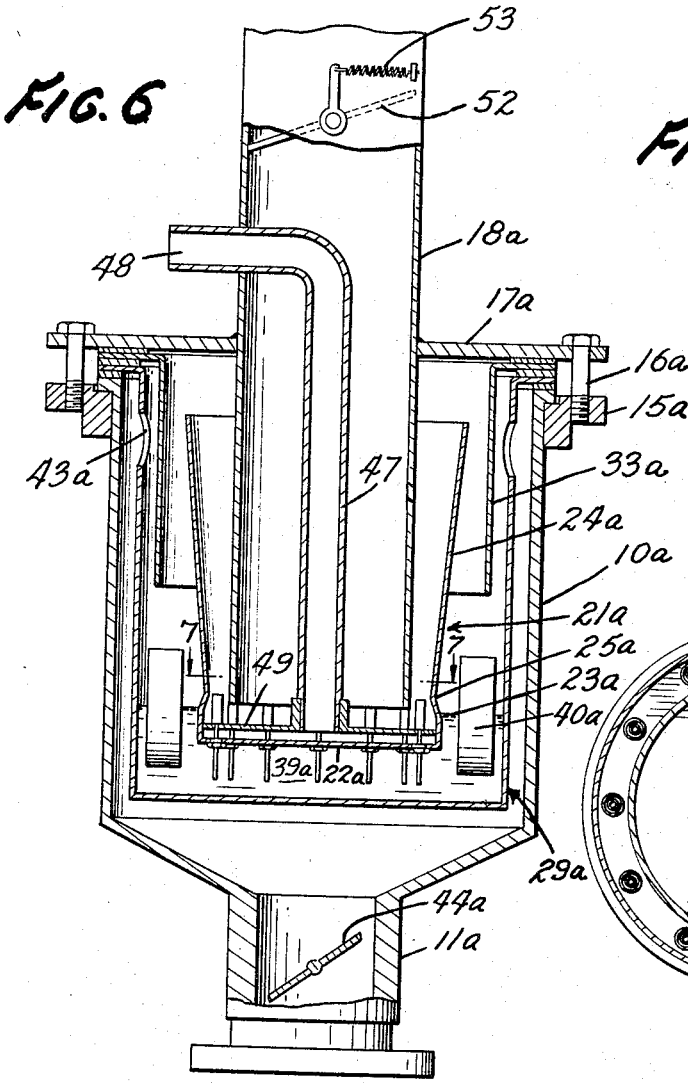
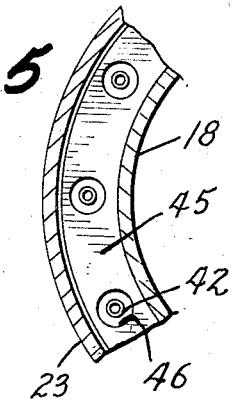
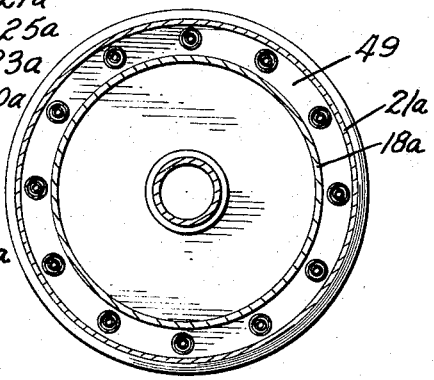
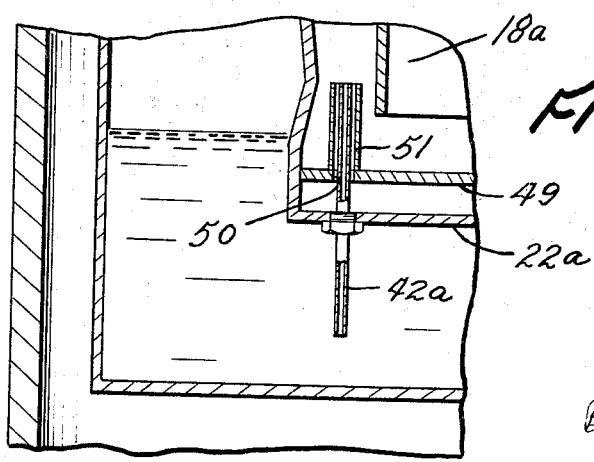

3,325,975
CARBURETOR
George C. Coverston, P.O. Box 151,
Fallon, Nev. 89406
Filed Apr. 26, 1965, Ser. No. 450,583
12 Claims. (Cl. 55—225)

The present invention relates in general to new and useful improvements in the vaporization liquid-gaseous mixtures to a point approaching invisibility as will be illustrated by its adaption to carburetion.

Present day carburetors cannot approach maximum efficiency without applying heat to break down the low grade fuel now used. It is known that a clear petroleum vapor should produce maximum efficiency, as invisability denotes absence of unvaporized fuel.

Liquids used as fuel are at their greatest efficiency when, like solids such as magnesium they are vaporized or triturated to their finest microscopic state.

Most carburetors depend upon heat to accomplish a more or less poor vaporization of the present day fuel, attaining in most cases a vapor of its more or less volatile elements interspersed with comparatively large unvaporized particles. The vaporized portion of the mixture must be properly proportioned in order to produce an explosive mixture. The unvaporized parts have little effect until explosion takes place, at which time they are torn asunder and having no surplus oxygen with which to unite, they hamper the efficiency of the flammable mixture surrounding them, causing it to become less efficient and highly carbonized. This unwanted carbonization results in many engine troubles such as, scored cylinders, sticky piston rings, improperly seating valves, preignition and also causes smog.

The dependence on heat to vaporize the mixture has its drawbacks including the amount necessary to produce any appreciable results. Even with heat the jet engine does not accomplish best results without the use of an afterburner.

Without resort to heat, my invention initially produces a fuel mixture approaching invisibility, which is encouraged to eject its larger particles in a manner whereby they reenter the liquid and are re-circulated. The remaining vapor needs no preignition heating to make substantially all of it entirely combustible.

Carburetors have been made with spray heads. But, I can find none with my preferred type of vaporization, in which I use a plurality of minute liquid carrying tubes, or ducts, having one end in communication with the liquid and the other end inside of a proportioned venturi through which the passing air draws the liquid from the tube, or duct, to initially form an optimum combustible mixture.

Almost universal practice is the use of one or a few large jets within a venturi vaporizing very little of the liquid. This method is compatible with my invention, but when used, in order to gain the desired vaporization the larger percentage of particles must be returned for recirculation. This contingency is anticipated in my invention by providing means for encouraging the larger particles to leave the sprayed mixture and return to the liquid for re-circulation.

It is a principal object of this invention to provide a vapor generator that will initially break up and spray a liquid and a gas into an optimum vapor without the use of heat.

It is another object of this invention to provide a novel generator in which a liquid is vaporized as nearly as practical and intermixed with the gas to form a vapor from which the larger particles are encouraged to return to the unsprayed liquid leaving a vapor, mist, cloud or fog for utilization where needed.

It is a related object of this invention to provide a novel and efficient carburetor for use on conventional engines.

It is still another object of this invention to provide a novel super-charger of simple construction.

It is a related object of this invention to provide a vapor generator for use with jet engines.

It is still another object of this invention to provide a vapor generator which delivers compressed gas for utilization where desired.

It is yet another object of this invention to provide a vapor generator in which the gaseous vapor is produced by suction.

Still other objects and advantages of the present invention will be apparent from the following description thereof with reference to the accompanying drawings and appended claims.

Figure 3:
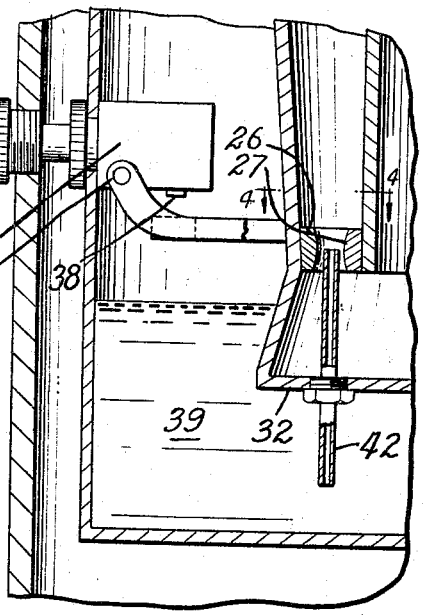
Figure 2:
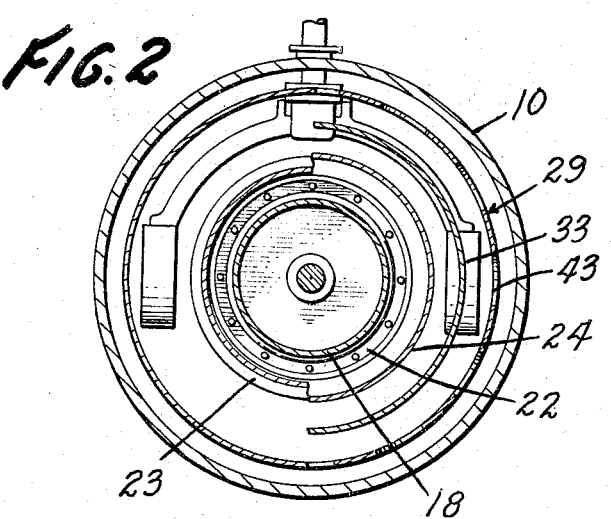
Figure 4:
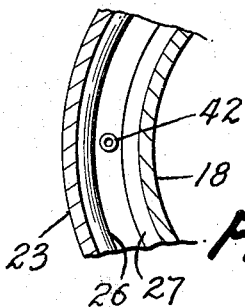
Figure 9:
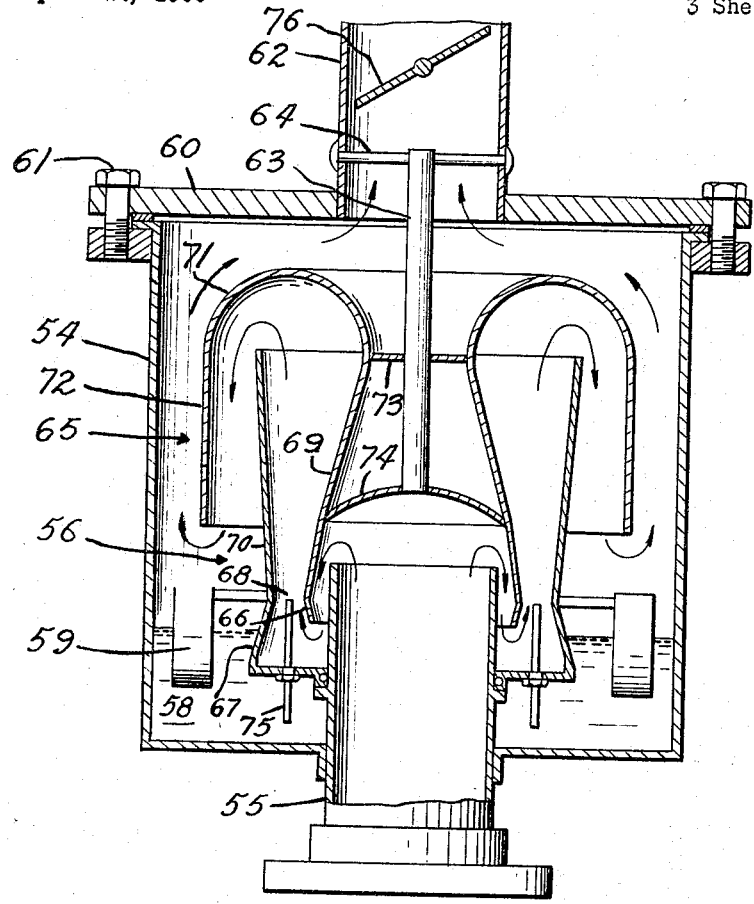

In the drawings FIG. 1 is a cross-sectional elevation of a preferred form of vapor generator made in accordance with the teachings of my invention; FIG. 2 is a cross-section taken on the line 2—2 of FIG. 1; FIG. 3 is fragmentary cross-sectional elevation on an enlarged scale showing the arrangement of the float controlled fuel inlet valve; FIG. 4 is a fragmentary cross-section taken on the line 4—4 of FIG. 3; FIG. 5 is a fragmentary horizontal cross-section similar to that of FIG. 4, but showing a modified form of annular venturi throat; FIG. 6 is a cross-sectional elevation of a modified form of my invention; FIG. 7 is a cross-section taken on the line 7—7 of FIG. 6; FIG. 8 is a fragmentary cross-sectional elevation on an enlarged scale showing the arrangement for introducing secondary air in the modified form of invention shown in FIG. 6; and FIG. 9 is a cross-sectional elevation of another modified form of my invention.

Referring now to the drawings in detail, and more particularly to the preferred form of my invention as shown in FIGURES 1–4, it will be seen that my invention includes a cylindrical container 10 having a centrally located downwardly directed outlet conduit 11 for vaporized gases, the lower end of this conduit being provided with a flange 12 to enable the apparatus to be secured to the intake mainfold 13 of an internal combustion engine as by means of studs 14. The upper end of the container 10 may be provided with an outwardly directed flanged portion 15 which is suitably threaded to receive cap screws 16 for securing a cover 17 in place.

Centrally located in the cover 17 is a downwardly directed cylindrical air conduit 18, the lower end of which terminates within the container but spaced from the bottom thereof. The upper end of the conduit (not shown) is open to the atmosphere or may be connected with a conventional air cleaner. Located within the air conduit is a vertically extending support member 19 which may be suspended from a cross member 20 which passes through the walls of the conduit 18. The lower end of the support 19 is attached to a generally cup-shaped element, indicated generally by numeral 21. While the bottom 22 of the cup-shaped element is shown in the drawing as being flat, it could be slightly curved but, in any event, is spaced below the bottom of the air conduit 18. The lower sidewall 23 of the cup-shaped element is flared inwardly at an angle approximating 30° while the upper sidewall 24 is flared slightly outwardly at an angle of approximately 5° so that it will be observed that the cup-shaped element 21 forms with the wall of the air conduit an upwardly directed venturi means having a throat portion indicated by numeral 25. While this throat portion could be formed by the respective walls of the conduit and cup-shaped element, it can be seen in FIG. 3 that a more precise regulation of the opening can be obtained by the provision of a pair of annular rings 26 and 27 to define this throat.

A tube 28, connected with a source of liquid (not shown), enters through an opening in the side wall of the container 10 and passes on through another opening in the side wall of a second cup-shaped element 29 as shown in FIG. 3. The upper end of this cup-shaped element may be provided with an outwardly directed flange 30, which rests on an annular gasket 31 which, in turn, may be supported on an annular gasket 31 placed on the flange 15 of the container. This second cup-shaped member is thus seen to be supported with its side wall arranged concentrically within the container and spaced inwardly from the walls of the container and outwardly from the wall of the first cup-shaped element 21. The bottom wall 32 is also spaced above the bottom of the container. The cylindrical baffle 33 is also suspended within the container by means of an outwardly directed flanged portion 34 and secured by the cover of the container between upper and lower gaskets 35 and 36. The baffle 33 is placed between the two cup-shaped elements and in spaced relationship to both of them, while the lower margin of the baffle extends considerably below the upper margin of the element 21.

Liquid fuel from the tube 28 is introduced into the bottom of the cup-shaped element 29 through a conventional float controlled valve 37, and is discharged through an opening 38. Liquid fuel collects in the bottom of the cup-shaped element 29 to form a body of fluid indicated by numeral 39, the level of which is maintained somewhat above the bottom 22 of the cup-shaped element 21 by a float means 40 pivotally supported at 41 on the valve means 37.

A series of tubes, or nozzles 42 extend through an annularly arranged series of openings provided in the bottom plate 32, the lower ends of these tubes being immersed in the fluid 39 while their upper, or outlet, ends are arranged so that liquid fuel will be discharged at the throat of the annular venturi. While I do not wish to be restricted in my invention, I have found in practice that the best results are obtained when the inside diameter of the nozzles is small enough to have a capillary effect. In one form of apparatus produced for use with gasoline the inside diameter of the tubes is eleven thousandths of an inch while the outside diameter is thirty-two thousandths of an inch; the width of the annular throat in this instance being thirty-five thousandths of an inch.

In operation, atmospheric air enters the conduit 18 and flows downwardly to impinge on the bottom of the cup-shaped element 21 where it is forced to change direction to enter the inlet of the annular venturi and pass upwardly through the throat 25 at which point it draws liquid fuel from the outlet of the nozzles 42. The liquid, in passing upwardly through the outlet of the venturi is vaporized to a high degree. This vaporized fluid again reverses direction when it reaches the cover of the container and is forced to flow downwardly by the presence of the baffle 33. The vaporized fluid then is forced to change direction again in passing below the baffle because of the presence of the side wall of the second cup-shaped element 29. However, during the course of this reversal of direction substantially all of the unvaporized particles of liquid present in the gas stream fall downwardly into the exposed portion of the body of liquid fuel in the bottom of the cup. The vaporized gas liquid and air stream then passes upwardly and through suitable openings 43 into the space between the cup and the wall of the container. The vaporized and combustible gas then passes downwardly and out through the conduit 11 and into the manifold 13. The rate of flow, of course, can be controlled by means of a conventional butterfly valve 44.

In FIGURE 5 there is shown a modified form of venturi throat which can be suitably employed with the previously described form of invention. Instead of the rings 26 and 27 an annular plate 45 is inserted to horizontally bridge the space between the conduit 18 and the cup-shaped element 21 at the throat of the venturi formed therebetween. This plate, however, is provided with a series of openings 46, each opening being concentrically disposed with respect to one of the nozzles 42 and being of somewhat larger diameter. While there is an annular venturi effect produced between the inner conduit and the cup-shaped element, the liquid is initially introduced into this venturi by means of a series of annularly arranged individual secondary venturies created by the openings in the plate 45.

Operation of the modified form of vapor generator shown in FIG. 5 is essentially the same as in the case of the preferred modification, the path of flow being indicated by the arrows in FIG. 1; the only difference being that air from the conduit 18 is introduced into the upper portion of the annular venturi means in the form of a series of individual jets created as it passes through the openings 46.

Still another modified form of the invention is shown in FIGS. 6 through 8, this form of invention being capable of supplying a secondary source of air which is required for certain types of internal combustion engines when operating at idling speed. The principal elements of this modified form are generally similar to those employed in the invention shown in FIGS. 1 through 4. Thus there is an open topped container 10a, having a central outlet at the bottom 11a and an outwardly directed flange 15a at the top to receive the cap screw 16a for securing the cover 17a in place. The air conduit 18a projects downwardly through a central opening in the cover.

However, the inner cup-shaped element, indicated generally by numeral 21a, is supported below the conduit 18a by means of a tube 47 which passes upwardly through the center of the conduit and at its upper end is bent at right angles to pass outwardly through an opening in the main conduit so that the upper end 48 of the tube is open to the atmosphere.

The structure of this cup differs from the previous one in that the horizontal plate 49 is disposed inside, spaced slightly above the bottom wall 22a and the lower end of the tube 47 is attached to this plate and is in communication with the space between the plate and the bottom of the cup through a suitable opening provided in the plate. The lower wall portion 23a above the plate 49 slopes inwardly towards the throat portion 25a while the upper wall portion 24a slopes outwardly, thus forming with the conduit 18a and annular venturi means.

A second generally cup-shaped element 29a is also provided and contains a body of liquid fuel 39a under the control of float means 40a. A series of annularly arranged nozzles 42a have their lower ends in communication with the body of fluid with their outlet ends disposed at the throat 25a of the venturi means formed by the cup-shaped element 21a and conduit 18a.

Details of the construction of the inlet for idling air can best be seen in FIG. 8 wherein it is shown that the plate 49 is provided with a series of openings 50, each of which is disposed concentrically with respect to a nozzle 42a and sufficiently larger in diameter to permit air from the space between the plate 49 and the bottom 22a to pass upwardly around the outside of each of the nozzles. Surrounding each of the openings and extending upwardly therefrom are a series of tubes 51 concentrically arranged with respect to the nozzle for the purpose of channelling the air upwardly to the discharge end of each of the nozzles. Air conduit 18a is furthermore provided with a butterfly valve 52, biased toward a closed position by means of a coil spring 53. The purpose of this valve is to close the conduit 18a when there is only a small demand for combustible fuel, such as when an engine is idling under which conditions the air for atomizing the liquid fuel is supplied only through the tubes 51. The result is that the combustible mixture is somewhat more enriched under idling conditions, but when the engine is speeded up and the demand for gas is increased the butterfly valve 52 is forced open against the force of spring 53 at which point the major proportion of air will be supplied through conduit 18a.

Operation of this modified form of invention is generally similar to the previously described modifications, the atomized mixture of liquid and air passing upwardly from the throat 25a over the top of the cup-shaped element 21a, thence downwardly below the baffle 33a where the unvaporized particles fall back into the fluid body 39a, upwardly and out through openings 43a and, finally downwardly through the conduit 11a under the control of throttle valve 44a.

All of the previously described forms of my invention have been intended for use in socalled "down-draft" carburetion systems. In the form of my invention shown in FIG. 9 there is disclosed a vapor generator suitable for use with what are called "up-draft" systems.

In the form of my invention shown in FIG. 9 a container 54 is shown having a gas inlet conduit 55 entering vertically through a central opening in the bottom of the container and extending upwardly a short distance therein. A generally cup-shaped element, indicated generally by numeral 56, is provided with a centrally located opening in its bottom surface 57, this opening being of a size such that the cup may be supported concentrically on the conduit 55 with the bottom 57 spaced somewhat below the top of the conduit. Liquid can be admitted to the interior of the container through valving means (not shown) to provide a body of liquid 58 in the bottom of the container and maintained at a constant level, such as by conventional float means 59, below the level of the inlet 55 and preferably slightly above the bottom of the cup 56.

A cover 60 is secured to the top of the container by means of cap screws 61. Projecting upwardly from a central opening in the cover is an outlet conduit 62, the lower end of this conduit preferably not extending below the cover. A vertical rod 63 is suspended from a cross member 64 extending through the conduit 62 for the purpose of supporting an annular element, indicated generally by numeral 65 which somewhat resembles an inverted channel shaped device. The inner skirt 66 of element 65 is spaced outwardly from conduit 55 and slopes upwardly and outwardly in an upward direction for a short distance to form with the inwardly sloping wall 67 of element 65 the entrance to an annular venturi whose throat is located at the point indicated by number 68. From this point upwardly the wall 69 of element 65 slopes inwardly and the wall 70 of element 65 slopes outwardly to form the discharge portion of an annular venturi. The reentrantly curved upper portion 71 and the downwardly directed annular outer skirt 72 of element 65 served to reverse the direction of the gas and liquid stream leaving the venturi means. The skirt portion 72 is spaced between the cup-shaped member 56 and the wall of the container and thus also serves as baffle to force the gaseous stream to travel downwardly towards the body of liquid before again reversing its direction to flow upwardly along the walls of the container and up through the outlet conduit 62. Horizontal plate 73 and 74, attached to the inside of the element 65 to support this element on the rod 63, plate 74 being downwardly curved from its central portion and spaced above the upper end of inlet conduit 55 so as to direct entering gas downwardly into the entrance to the annular venturi means. A series of nozzles 75 extend upwardly through the bottom plate 57 into the body of fluid 59, their discharge ends being arranged to introduce liquid into the throat 68 of the annular venturi means.

The gas entering the lower end of the venturi means travels upwardly in an annular stream, carrying liquid from the nozzles with it and vaporizing it in the process. After leaving the venturi means the upper portion 71 and the skirt portion 72 reverses the stream towards the exposed portion of the liquid. At this point the side wall of the container forces the stream to reverse direction again, but the mass of the unvaporized particles prevents them from changing direction and they return to the liquid, and only the vaporized gas and liquid mixture can enter the outlet 62, when the rate of flow may be controlled by a conventional butterfly valve 76.

Having disclosed several embodiments of my invention, it will be understood that various changes and improvements may be made which would come within the scope of the annexed claims. It should also be understood that, whereas certain of the embodiments disclosed and claimed have particular utility as carburetors for producing combustible mixtures of air and liquid fuels. I do not wish to be limited to such use.

Therefore, wherever the words "air" or "liquid fuel" are used, it should be understood that these words include any gas or any liquid, respectively.

I claim:

1. Apparatus for generating a droplet free gaseous vapor from a gas and a body of liquid to be vaporized comprising, means forming a chamber, means in the chamber for retaining a body of liquid therein, vertical capillary tube means mounted in the chamber, the tube means having a lower extremity in communication with said liquid, means forming a continuous passageway extending through said chamber, said last-named means including means forming a venturi having an inlet and outlet, the upper extremity of said capillary tube means being disposed in the inlet of the venturi so that gas passing through said passageway in venturi withdraws liquid from the tube means to form a vapor, said passageway further including baffle means connected to the outlet of the venturi for redirecting the vapor in a curved path such that any droplets therein are cast out of the vapor due to the action of centrifugal forces, said baffle means having an opening therein to permit the droplets to return to the body of liquid for recirculation.

2. Apparatus as in claim 1 wherein the baffle means is so arranged that gravity cooperates with the centrifugal forces created in redirecting the vapor to aid in casting out any droplets.

3. Apparatus as in claim 1 wherein said venturi is in the form of an elongate channel and in which said capillary tube means includes a plurality of tubes together with means mounting said tubes in spaced apart positions along said channel.

4. Apparatus as in claim 2 for use with gasoline wherein the inside diameter of the capillary tubes is about .011 inch.

5. Apparatus as in claim 1 wherein said means forming said continuous passageway includes a vertical tube mounted in said chamber, said vertical tube having an upper end serving as a gas inlet and a lower end serving as a gas outlet, and further including a cylindrical wall surrounding said vertical tube and forming therebetween an annular venturi passage at the lower end of said vertical tube and an upwardly extending cylindrical outlet from said venturi passage, together with a cylindrical baffle spaced outwardly from and surrounding said wall so that gas and vapor leaving said cylindrical outlet is redirected downwardly.

6. The invention as defined in claim 5, wherein a second cylindrical baffle means is positioned within said chamber spaced outwardly from said first mentioned baffle means to redirect vaporized liquid in an upward direction.

7. In a carburetor for an internal combustion engine, the combination including, a primary air inlet conduit having an outlet at one end, said primary air inlet including valve means, said valve means including biasing means for restricting the flow of primary air when the engine is idling, a generally tubular element surrounding and spaced from the outside wall of the inlet conduit, said tubular element and conduit forming an annular venturi passage, the inlet of the passage being in communication with the outlet of the conduit, a plurality of nozzles having their outlets in communication with the throat of the annular venturi passage, a plurality of secondary air passages, each surrounding and spaced from a respective nozzle, means to supply liquid fuel to said nozzles, and means to supply air to said secondary air passages.

8. An up-draft carburetor for producing a combustible gas and liquid mixture comprising, a closed container having a central gas inlet conduit extending upwardly through the bottom thereof and having an outlet at the top, means for supplying and maintaining a body of liquid in the container, an upwardly directed annular venturi means supported within the container, a plurality of annularly arranged nozzles for introducing liquid from said body of liquid into the throat of said venturi means at a plurality of spaced locations, and baffle means for directing air from the inlet downwardly and outwardly in an annular stream thence upwardly into said venturi means to vaporize liquid from said nozzles thence downwardly in an annular stream to return unvaporized particles to said body of liquid thence upwardly in an annular stream toward said outlet.

9. A gas and liquid contact apparatus comprising, a closed vessel having an inlet conduit in one wall and an axially aligned outlet conduit in an opposite wall, means for supplying and maintaining an exposed body of liquid within said vessel, annular venturi means supported within said vessel, a plurality of nozzles arranged for introducing a plurality of streams of said liquid into the throat of said venturi means at a plurality of annularly spaced locations, means for directing gas from said inlet conduit into the intake of said venturi means to vaporize liquid from said nozzles, and baffle means for reversing the direction of the gas and liquid stream from said venturi means in an annular stream to return unvaporized particles to said exposed body of liquid and to again reverse the direction of said annular stream before entering said outlet conduit.

10. The invention as defined in claim 9, wherein said baffle means is arranged to again reverse the direction of said annular stream before entering said outlet conduit.

11. A down draft carburetor for attachment to the intake manifold of an engine comprising, a cylindrical container open at the top and having a central opening at the bottom to exhaust combustible gas, a removable cover for said container, a cylindrical cup-shaped element concentrically supported within the container with the bottom and side walls of the cup-shaped element spaced from the respective bottom and side walls of the container, the side wall of the cup-shaped element having an opening therein adjacent the top, means to supply liquid fuel to the bottom of said cup-shaped element including float means for maintaining said liquid at a constant level, a cylindrical air inlet pipe extending vertically downwardly through the center of said cover and having its outlet spaced above the bottom of said cup-shaped element, a second cup-shaped element positioned with its bottom wall spaced below said outlet and having its side wall spaced between the inlet pipe and the first-mentioned cup-shaped element, said second cup-shaped element forming with said pipe a vertical upwardly directed annular venturi, nozzle means for discharging said liquid upwardly into the throat of said annular venturi, and a cylindrical baffle depending from said cover and being concentrically spaced between said two cup-shaped elements.

12. Liquid fuel vaporization apparatus comprising in combination a closed chamber, tubular means forming a vertical gas passage in said chamber having an outlet at its lower end, a cylindrical wall surrounding said tubular means in said chamber and forming therewith an annular venturi passage having an inlet in communication with said gas passage outlet and an upwardly directed outlet, means to supply and confine a body of liquid fuel within said chamber, a plurality of spaced vertical tubes having their inlets in communication with said liquid fuel and having outlet orifices in communication with the venturi passage inlet so that gases passing alongside said outlet orifices withdraw and vaporize said liquid, the throat portion of said venturi passage being closed by an annular ring, said ring having a plurality of vertical passages corresponding to the number of vertical tubes, each said vertical passage surrounding the outlet orifice of a respective tube, cylindrical baffle means spaced outwardly from the venturi passage outlet to direct vaporized liquid downwardly toward the surface of the liquid fuel, and vapor passage means having an annular inlet within the chamber and in communication with said vaporized liquid.

References Cited
UNITED STATES PATENTS

| | | | |
|---|---|---|---|
| 862,196 | 8/1907 | Peregrine | 55—441 X |
| 1,533,775 | 4/1925 | Thomas. | |
| 1,828,134 | 10/1931 | Fahrney. | |

FOREIGN PATENTS

| | | |
|---|---|---|
| 989,494 | 5/1951 | France. |

HARRY B. THORNTON, *Primary Examiner.*

RONALD R. WEAVER, *Assistant Examiner.*